United States Patent
Boutreux et al.

(10) Patent No.: US 6,406,189 B1
(45) Date of Patent: Jun. 18, 2002

(54) METHOD OF MANUFACTURING A CAGE FOR A ROLLING BEARING

(75) Inventors: Michel Boutreux; Vedran Tadic, both of Tours; Yannick Fierling, Petit-Rederching, all of (FR)

(73) Assignee: SKF France, Clarmart Cedex (FR)

( * ) Notice: Subject to any disclaimer, the term of this patent is extended or adjusted under 35 U.S.C. 154(b) by 0 days.

(21) Appl. No.: 09/548,383

(22) Filed: Apr. 10, 2000

(30) Foreign Application Priority Data

Apr. 8, 1999 (FR) ............................................. 99 04419

(51) Int. Cl.[7] ............................................... F16C 33/56
(52) U.S. Cl. ....................................................... 384/527
(58) Field of Search ................................ 384/527, 523, 384/531, 532, 576, 572

(56) References Cited

U.S. PATENT DOCUMENTS 5,131,762 A * 7/1992 Waskiewicz
5,807,920 A 9/1998 Ueno et al. .................. 524/504

FOREIGN PATENT DOCUMENTS

| EP | 0 638 737 | 2/1995 |
| FR | 2 667 074 | 3/1992 |

* cited by examiner

*Primary Examiner*—Lenard A. Footland
(74) *Attorney, Agent, or Firm*—Smith, Gambrell & Russell

(57) ABSTRACT

Method for manufacturing a cage, of the type intended to hold rolling bodies in place in a rolling bearing comprising at least one row of rolling bodies arranged between two raceways. The said cage comprises an annular part with cells intended to accommodate the rolling bodies, the said rolling bodies being clipped into the cells and held therein by means of elastically deformable members. The cage is obtained by moulding a blend of a polymer from the polyphthalamides group and of an elastomer.

20 Claims, 2 Drawing Sheets

METHOD OF MANUFACTURING A CAGE FOR A ROLLING BEARING

The invention relates to synthetic cages for rolling bearings.

These cages are in the form of an annular element with a certain number of cells intended to accommodate the rolling bodies, for example balls, and space them correctly and uniformly in the circumferential direction with respect to one another and thus avoid any imbalance as the bearing rotates.

The cells are generally bordered, at least on two opposite sides in the circumferential direction, with retaining tabs intended to hold the rolling bodies in the cells and, during operation, hold the cage in place on the row of rolling bodies.

The cage is therefore mounted on the rolling bodies (or the rolling bodies are mounted in the cells of the cage) by clipping the rolling bodies and cells together using the flexibility of the retaining tabs.

Thus, in the case of a rigid ballbearing, the retaining tabs extend the cells in such a way as to define an opening, the diameter of which is slightly smaller than that of the ball.

The row of balls is first of all mounted between the outer ring and the inner ring of the bearing. The balls are then spread out circumferentially using an appropriate tool.

The cage is positioned over the balls in such a way that each cell faces each ball.

The cage is pushed axially towards the row of balls, which causes the retaining tabs to open up, these then closing up again over the balls by elasticity as soon as these balls have adopted the correct position in the spherical cells.

The cage is then centred radially with respect to the rings by the spherical cells and is held axially on the said row of balls by the retaining tabs belonging to the cells.

Such cages are known per se and have been used for many years.

These cages, by comparison with metal cages, have the advantage of a low production cost and of having a low mass and therefore low inertia.

The good slip properties of plastic on steel also encourages running with little friction and therefore little wear and so generates little heat and consumes little energy.

Finally, such types of cage also play a part in making the bearing run more quietly.

These cages are mass-produced by injection moulding a material such as polyamide (PA), possibly filled with glass fibres in order to improve its mechanical properties.

The main parameters which limit the possibility of using synthetic cages in bearings are the running temperature and the ageing that is due to chemical attack from the lubricant.

Thus, in the case of a cage made of nylon-6,6, reinforced with glass fibres, the operating temperature is limited to 120° C. in continuous use.

This limit can be pushed back by using cages made of better materials such as polyphenylene sulphide (PPS) resins with a crosslinked structure, polyether sulphone (PES) resins, polyetherimide (PEI) resins or polyetheretherketone (PEEK) resins, but these materials exhibit two major drawbacks:
  high cost price
  lack of flexibility making the cage difficult to release from the mould and also making it difficult for the rolling bodies to be mounted in the cells (risk of breaking the tabs).

It might also be possible to envisage a polymer from the polyphthalamides (PPA) group, but PPA is a material with low ductility which cannot therefore be used to obtain a cage whose retaining tabs are flexible enough to allow easy release of the said cage from the mould and to allow the rolling bodies to be mounted in the cells without the risk of breaking the latter.

The invention sets out to solve all of these problems.

The object of the invention is to produce a cage for high temperatures, which is chemically resistant to lubricants, has flexible retaining tabs and is of low cost.

The manufacturing method according to the invention is intended for cages of the type intended to hold rolling bodies in place in a rolling bearing comprising at least one row of rolling bodies arranged between two raceways. The said cage comprises an annular part with cells intended to accommodate the rolling bodies, the said rolling bodies being clipped into the cells and held therein by means of elastically deformable members. The cage is obtained by moulding a blend of a polymer from the polyphthalamides group and of an elastomer.

As a preference, the said polymer from the polyphthalamides group is obtained by the polycondensation of hexamethylenediamine, terephthalic acid, isophthalic acid and adipic acid.

In one embodiment of the invention, the said blend is filled with glass fibres, the glass fibres being incorporated into the blend prior to moulding.

Another subject of the invention is a cage for rolling bodies of a rolling bearing, comprising a polymer from the polyphthalamides group and an elastomer which are blended together, and a rolling bearing equipped with such a cage.

As a preference, the melting point of the material of which it is made is 300° C. or higher.

In one embodiment of the invention, the glass transition temperature of the material of which it is made is 130° C. or higher.

In one embodiment of the invention, the uppermost temperature for continuous use is 140° C. or higher when used in contact with a lubricant.

In one embodiment of the invention, the ductility of the material of which it is made is 5% or higher.

In one embodiment of the invention, the bending strength of the material of which it is made is 260 N/mm$^2$ or higher.

In one embodiment of the invention, the impact strength of the material of which it is made is 50 kJ/m$^2$ or higher.

The rolling bodies are balls or rollers.

The material obtained according to the invention has a semi-crystalline structure and good properties in respect of:
  highest temperature compatible with the chemical resistance to the various lubricants used in the bearing,
  ductility,
  flexibility,
  fatigue strength,
  impact strength,
  dimensional stability.

The present invention will be better understood from the description of a rolling bearing and of a cage which are taken by way of entirely non-limiting examples and illustrated by the appended drawings, in which.

Figure 1:
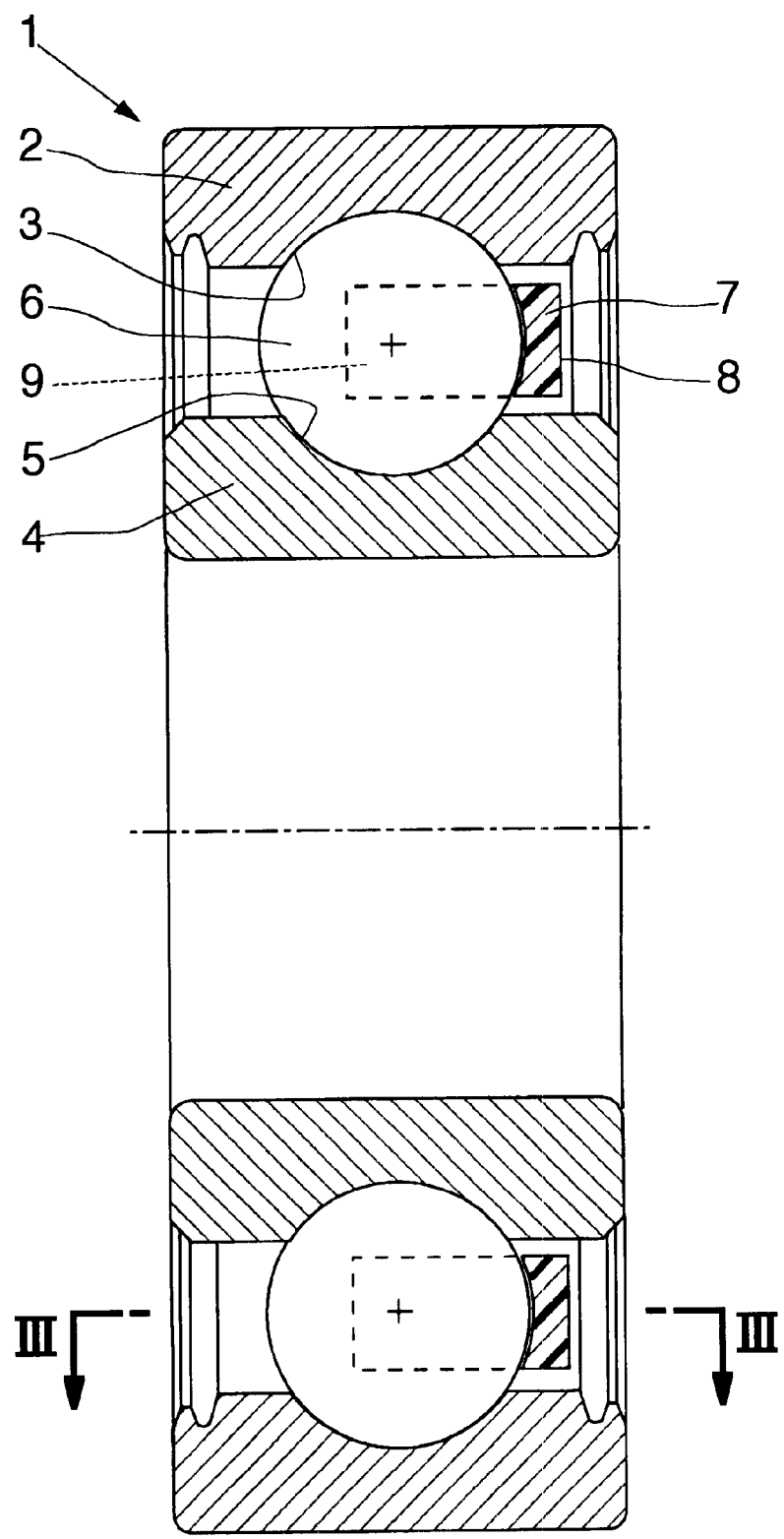
FIG. 1 is a view in axial section through a ballbearing.
Figure 2:
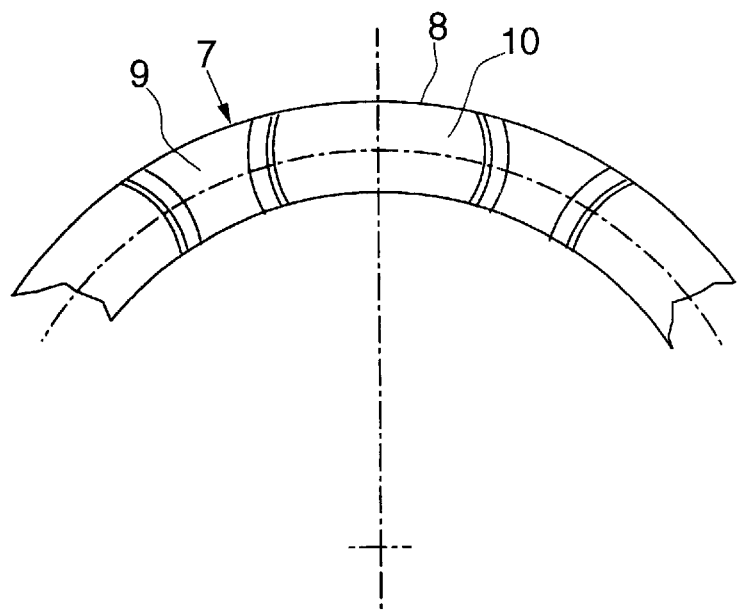
FIG. 2 is a partial front view of a cage.
Figure 3:
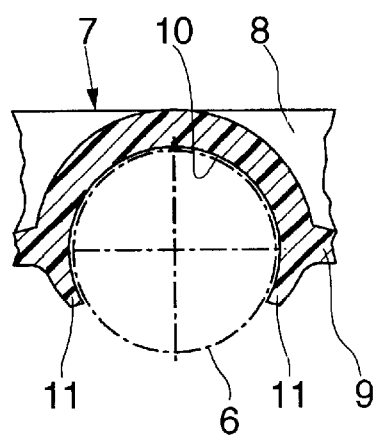
FIG. 3 is a view in section on III—III of FIG. 1.

As can be seen in FIGS. 1 to 3, the bearing 1 of the conventional type known as a rigid single-row ballbearing, comprises an outer ring 2 which, on its bore has a toric raceway 3, an inner ring 4 provided on its outer surface with a toric raceway 5, and a row of rolling bodies 6, for example balls, arranged between the raceway 3 of the outer ring 2 and the raceway 5 of the inner ring 4.

The row of rolling bodies 6 is held in place by a cage 7 made of a synthetic material and comprising an annular part 8 arranged between the outer ring 2 and inner ring 4 on one side of the row of rolling bodies 6, and spacing parts 9 arranged between the said outer ring 2 and inner ring 4 and between the rolling bodies 6. The annulus 8 and the spacing parts 9 define a number of spherical cells 10 which circumferentially are uniformly distributed and in each of which a rolling body 6 is placed. The spacing parts 9 end axially away from the annulus 8 in tabs 11 which hold the cage 7 in place with respect to the rolling bodies 6.

According to the invention, the cage 7 is made by moulding a blend of a polymer from the PPA group and of an elastomer.

PPA/elastomer, just like conventional PPA, is characterized by a high melting point (300–320° C.).

A synthetic cage experiences chemical attack from the lubricant contained in the bearing, this attack causing the material to age with degradation of its properties. The higher the running temperature, the more rapid this ageing will be.

An upper limiting temperature for continuous running, below which the bearing can be sure of having a normal service life without appreciable degradation of the properties of the cage has to be defined for each type of lubricant (oil, grease).

Given the very good chemical resistance to the various lubricants used in bearings, a cage made of PPA/elastomer allows the bearing to run at temperatures of the order of 140° C. to 160° C. in continuous operation depending on the type of lubricant used, with possible low-duration temperature spikes of the order of 230° C.

This performance is much better than the performance of a nylon-6,6 (A3HG5) commonly used for the manufacture of bearing cages and the maximum continuous temperature of which is of the order of 120° C.

The table below shows the results of a comparative study made on PA-6,6 and a PPA/elastomer using several types of lubricant (greases and oils).

| Grease or Oil (*) | Max. service temperature compatible with the chemical resistance to the lubricants | |
|---|---|---|
| | Cage made of Ultramid A3HG5 | PPA/elastomer cage |
| LHT23 (Kyodo Yushi Multemp SRL) | 135° C. | >160° C. |
| Shell Spirax EP 80 W (*) | 120° C. | 150° C. |
| Shell Donnax TA D-21774 ATF (*) | 130° C. | >160° C. |

Given the diversity of lubricants available, the service temperature of a PPA/elastomer cage compatible with ageing due to the lubricants commonly used is 140° C. minimum.

By adding an elastomer into the basic polymer, the ductility of the PPA/elastomer, measured according to ISO 527, is 5% or higher, which fully satisfies the minimum criteria required for use in a rolling bearing cage.

This ductility allows:
the cage to be extracted from the mould easily when manufacturing the cages without the risk of breaking or permanently deforming the retaining tabs which border the cells,
the rolling bodies, such as balls, to be mounted in these cage cells in complete safety, without the risk of breaking the retaining tabs.

Specifically, as the balls are introduced into their cells, the retaining tabs are substantially deformed. This deformation gives rise to a high concentration of stresses at the base of the tabs inside the cells.

This stress will cause cracks or microcracks if the ductility of the material is lower than 5%.

Most polymers which have high ductility unfortunately have low resistance to chemical attack from the lubricants.

The PPA/elastomer blend is an excellent compromise between good behaviour in the face of chemical attack from the lubricants and sufficient ductility to allow the rolling bodies to be mounted in the cells.

The bending strength obtained using the material according to the invention is 260 N/mm$^2$ or higher.

The dynamic fatigue strength of the PPA/elastomer satisfies the minimum criteria demanded for use in a rolling bearing cage (a minimum 0.5% deformation of a standard test specimen for $10^8$ cycles) and is approximately equivalent to that of a PA-6,6, given the glass transition temperature which is of the order of 130° C. for a PPA/elastomer as compared with 75° C. for a nylon-6,6.

Let us remember that the glass transition temperature is the temperature at which the amorphous regions of a semi-crystalline polymer become elastic and therefore improve the elasticity of the material.

The impact strength of this material is greater than 50 kJ/m$^2$ whereas the minimum criteria required for a rolling bearing cage application are of the order of 34 kJ/m$^2$.

A cage according to the invention made of PPA/elastomer also has good dimensional stability properties, this being an important parameter for correct operation of the bearing, there being no risk that the cage will begin to rub against the rings or that the cage cells will move out-of-centre with respect to the rolling bodies as a result of dimensional variations.

A PPA cage according to the invention also has only a low ability to absorb water, thus avoiding dimensional variations caused by variations in hygrometry.

Finally, PPA/elastomer offers a lower cost than resins of the PEEK, PPS, PES or PEI type.

Of course, the basic material may be filled with glass fibres in order to improve its mechanical properties still further, if necessary.

What is claimed is:

1. Cage for a rolling body, characterized in that it comprises a polymer from the polyphthalamides group and an elastomer which are blended together.

2. A method for manufacturing the cage of claim 1 which is of the type intended to hold rolling bodies in place in a rolling bearing comprising at least one row of rolling bodies arranged between two raceways, the said cage comprising an annular part with cells intended to accommodate the rolling bodies, the said rolling bodies being clipped into the cells and held therein by means of elastically deformable members, in which method the cage is obtained by moulding a blend of a polymer from the polyphthalamides group and of an elastomer.

3. Method according to claim 2, in which the said blend is filled with glass fibres, the glass fibres being incorporated into the blend prior to moulding.

4. Method according to claim 2, in which the said polymer from the polyphthalamides group is obtained by the polycondensation of hexamethylenediamine, terephthalic acid, isophthalic acid and adipic acid.

5. Cage according to claim 1, characterized in that the melting point of the material of which it is made is 300° C. or higher.

6. Cage according to claim 5 characterized in that the glass transition temperature of the material of which it is made is 130° C. or higher.

7. Cage according to claim 5, characterized in that the uppermost temperature for continuous use is 140° C. or higher when used in contact with a lubricant.

8. Cage according to claim 5, characterized in that the ductility of the material of which it is made is 5% or higher.

9. Cage according to claim 5, characterized in that the bending strength of the material of which it is made is 260 N/mm$^2$ or higher.

10. Cage according to claim 5, characterized in that the impact strength of the material of which it is made is 50 kJ/m$^2$ or higher.

11. Cage according to claim 1, characterized in that the glass transition temperature of the material of which it is made is 130° C. or higher.

12. Cage according to claim 11, characterized in that the ductility of the material of which it is made is 5% or higher.

13. Cage according to claim 11, characterized in that the bending strength of the material of which it is made is 260 N/mm$^2$ or higher.

14. Cage according to claim 1, characterized in that the uppermost temperature for continuous use is 140° C. or higher when used in contact with a lubricant.

15. Cage according to claim 14, characterized in that the impact strength of the material of which it is made is 50 kJ/m$^2$ or higher.

16. Cage according to claim 1, characterized in that the ductility of the material of which it is made is 5% or higher.

17. Cage according to claim 1, characterized in that the bending strength of the material of which it is made is 260 N/mm$^2$ or higher.

18. Cage according to claim 1, characterized in that the impact strength of the material of which it is made is 50 kJ/m$^2$ or higher.

19. Cage according to claim 1, characterized in that the rolling bodies are balls or rollers.

20. Rolling bearing comprising a cage.

* * * * *